United States Patent
Tv (10) Patent No.: US 12,120,219 B2
(45) Date of Patent: Oct. 15, 2024

(54) MACHINE LEARNING-ENABLED CHARACTER BASED ENCRYPTION SYSTEM

(71) Applicant: SAP SE, Walldorf (DE)

(72) Inventor: Ramalingam Tv, Calgary (CA)

(73) Assignee: SAP SE, Walldorf (DE)

( * ) Notice: Subject to any disclaimer, the term of this patent is extended or adjusted under 35 U.S.C. 154(b) by 228 days.

(21) Appl. No.: 17/987,425

(22) Filed: Nov. 15, 2022

(65) Prior Publication Data

US 2024/0163079 A1     May 16, 2024

(51) Int. Cl.
| | |
|---|---|
| G06F 21/54 | (2013.01) |
| G06N 20/00 | (2019.01) |
| H04L 9/08 | (2006.01) |
| H04L 9/14 | (2006.01) |

(52) U.S. Cl.
CPC ........... H04L 9/0816 (2013.01); G06N 20/00 (2019.01)

(58) Field of Classification Search
CPC ... H04L 9/0816; H04L 2209/08; G06N 20/00; G06N 3/045; G09C 5/00
See application file for complete search history.

(56) References Cited

U.S. PATENT DOCUMENTS

| | | | | |
|---|---|---|---|---|
| 2023/0237374 A1* | 7/2023 | Lee | ........................ | G06N 3/048 706/12 |
| 2024/0013055 A1* | 1/2024 | Liu | ......................... | G06F 18/24 |
| 2024/0143906 A1* | 5/2024 | Ghosh | ..................... | G06F 40/18 |

FOREIGN PATENT DOCUMENTS

WO    WO-2023055517 A1 *   4/2023   ............. G06F 21/54

OTHER PUBLICATIONS

Daniel Holden, Jun Saito, Taku Komura, "A Deep Learning Framework for Character Motion Synthesis and Editing"; ACM Trans. Graph, vol. 35, No. 4, Article 138; Jul. 2016; pp. 1-11 (Year: 2016).*

* cited by examiner

*Primary Examiner* — Fatoumata Traore
*Assistant Examiner* — Courtney D Fields
(74) *Attorney, Agent, or Firm* — SCHWEGMAN LUNDBERG & WOESSNER, P.A.

(57) ABSTRACT

In an example embodiment, a solution is provided for encrypting and decrypting data in which the solution itself creates unique symbols, reducing or eliminating the possibility that a hacker or other malicious actor can understand what the symbols mean, let alone decrypt them. More particularly, for encryption, the characters of an original text is split into individual vector-based characters, and each of these vector-based characters are split into subcharacters at intersection points. Each of the split characters are then rotated, and the rotated characters are organized one on top of each other. The characters are then connected to each other, and the intersection points of the subcharacters within the characters that were used to split the characters into subcharacters are passed into a machine learning model that is trained to add lines between intersection points that have no lines, as noise to further obfuscate the original text.

20 Claims, 7 Drawing Sheets

MACHINE LEARNING-ENABLED CHARACTER BASED ENCRYPTION SYSTEM

BACKGROUND

Hacking or other malicious behavior on computer networks has traditionally been quite common and, if anything, is only getting worse. Often, a combination of public and private keys are utilized to keep data secret from hackers and other malicious parties, but these systems are complicated to handle and maintain.

BRIEF DESCRIPTION OF DRAWINGS

The present disclosure is illustrated by way of example and not limitation in the figures of the accompanying drawings, in which like references indicate similar elements.

DETAILED DESCRIPTION

The description that follows discusses illustrative systems, methods, techniques, instruction sequences, and computing machine program products. In the following description, for purposes of explanation, numerous specific details are set forth in order to provide an understanding of various example embodiments of the present subject matter. It will be evident, however, to those skilled in the art, that various example embodiments of the present subject matter may be practiced without these specific details.

The use of public and private keys to provide for encryption and decryption of data necessitates the distribution of keys. Not only does this add complexity to maintain and distribute all of the keys, but it creates a point of vulnerability in that an eavesdropper can obtain at least some of the keys at the distribution stage.

In an example embodiment, a solution is provided for encrypting and decrypting data in which the solution itself creates unique symbols, reducing or eliminating the possibility that a hacker or other malicious actor can even understand what the symbols mean, let alone decrypt them. More particularly, for encryption, the characters of an original text is split into individual vector-based characters, and each of these vector-based characters are split into subcharacters at intersection points. Each of the split characters are then rotated, and the rotated characters are organized one on top of each other. The characters are then connected to each other, and the intersection points of the subcharacters within the characters that were used to split the characters into subcharacters are passed into a machine learning model that is trained to add lines between intersection points that have no lines, as noise to further obfuscate the original text.

In a further example embodiment, to aid with decryption, each of the characters is assigned a different color, represented by a color code, and the noise lines are also assigned a color (different from all the characters). The resulting vector is then drawn in the assigned colors. Upon decryption, the system knows which color is assigned to noise and can remove the noise by removing lines in that color, using the machine-learned model.

Figure 1:
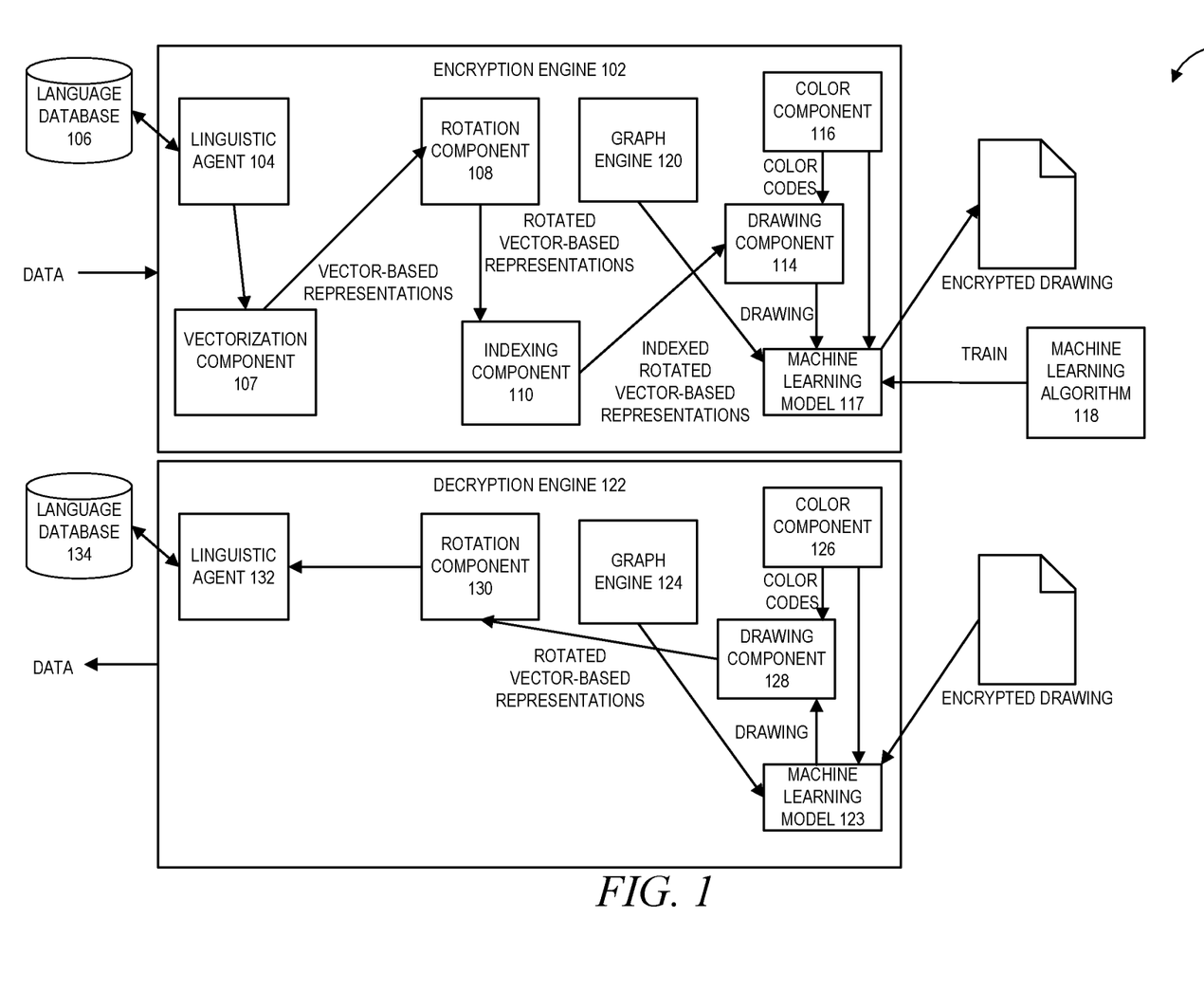
FIG. 1 is a block diagram illustrating a system for performing encryption and decryption of data, in accordance with an example embodiment.

FIG. 1 is a block diagram illustrating a system 100 for performing encryption and decryption of data, in accordance with an example embodiment. Data is input to an encryption engine 102. The encryption engine 102 accesses a linguistic agent 104 to determine the language of the data. More particularly, the linguistic agent 104 maintains a language database 106 containing information on various languages, and specifically the characters used in the language. These characters may include alphabetical characters, but may also include numerical, grammatical, or even symbolic characters as well. For example, the English language has 52 alphabetical characters ("A" through "Z" in uppercase and lowercase form), 10 numeric characters ("0" through "1"), and many grammatical and symbolic characters (e.g., punctuation, mathematical operators, etc.). With respect to symbolic characters, some are used in traditional scenarios (e.g., currency characters), but it is also possible to use symbols in non-traditional ways, such as using a symbol of the Eiffel Tower to mean "Paris." Some of the languages in the language database 106 may be traditional written languages (e.g., English, French, German, etc.), but others may be non-traditional languages (e.g., texting symbols, emojis, purely symbolic languages, etc.). For each language, the language database 106 may store pictorial representations of each letter of the language.

Regardless, the linguistic agent 104 identifies the language of the data and retrieves the pictorial representations of each character of the language. It then provides the pictorial representations to the encryption engine 102. A vectorization component 107 then vectorizes the pictorial representations of each character of the data. This vectorization involves forming vectors for each pictorial representation. In an example embodiment, each pictorial representation gets vectorized into two or more vectors, although in some embodiments it is possible to have a single vector for a simple pictorial representation, such as "1" (the number) or "1" (the letter). Each vector comprises two points and a line between the two points, although the line need not be the shortest path between the two points. For example, some characters have curves, such as "S," "B," "D," and so on. The vectors for those curved parts may be curved, such as arcs. Each of these vectors may be termed a "subcharacter," and thus most, if not all, of the characters in the text will be split into two or more subcharacters for each character.

A rotation component 108 then rotates each of the vectorized characters. In an example embodiment, the rotation may be either 90 degrees counterclockwise or 90 degrees clockwise, depending upon implementation. Nevertheless, embodiments are foreseen where other angles of rotation can be used. In some example embodiments, the degree of rotation may be dynamically determined at encryption time and saved as a parameter in a file that can be accessed during decryption.

Each of the characters in the data may also be assigned an index by an indexing component 110. The index represents the relative position of the character in the data. Thus, for example, if there are 5 characters in a piece of data, then each of the characters may be assigned an index from 0 though 4, with 0 being the index of the first character, 1 being the index of the second character, and so on. This is true regardless of whether some of the characters are repeated in the data. For example, the same character may be present at the $2^{nd}$ and $4^{th}$ position in the data, in which case that character will be assigned an index of "1" for the $2^{nd}$ position and assigned an index of "3" for the $4^{th}$ position.

A drawing component 114 then draws a figure by appending the vectors for each character, in an order represented by the index values, vertically one on top of each other, without leaving space between the vectors representing each character. More particularly, the ordering may either be in forward or reverse ordering of the corresponding indexes of the characters. In some example embodiments, the choice of whether to order the characters in forward or reverse ordering of the corresponding indexes of the characters is related to whether the vectorized characters were rotated counterclockwise or clockwise, and may also be related to whether the characters are from a language traditionally read left-to-right or right-to-left. This is because it is more difficult to observe a pattern in characters if they are ordered backwards from the way one would ordinarily recognize them. Thus, in an example embodiment, if the language is typically read left-to-right (such as English), then the ordering of characters in the vertical direction by the drawing component 114 should be, starting at the top, in a forward direction (e.g., 0, then 1, then 2, etc.) if the characters were rotated counterclockwise by the rotation component 108, and the ordering of the characters in the vertical direction by the drawing component 114 should be, starting at the top, in a reverse direction (e.g., 4, then 3, then 2, etc.) if the characters were rotated clockwise by the rotation component. Alternatively, if the language is typically read right-to-left (such as Hebrew), then the ordering of characters in the vertical direction by the drawing component 114 should be, starting at the top, in a forward direction (e.g., 0, then 1, then 2, etc.) if the characters were rotated clockwise by the rotation component 108, and the ordering of the characters in the vertical direction by the drawing component 114 should be, starting at the top, in a reverse direction (e.g., 4, then 3, then 2, etc.) if the characters were rotated counterclockwise by the rotation component 108.

As mentioned above, the drawing component 114 also acts to not leave space between the vectors representing each character. This may be accomplished by, as best as possible, connecting intersection points on the border of one character with the intersection points of the adjacent border of an adjacent character. Thus, for example, if a first character is the letter "P" and a second character is the letter "E", rotating the characters counterclockwise and ordering them so that the rotated P is on the top of the rotated E, then the end points of the straight line making up part of the P can be connected to the end points of the first and third shorter straight lines that make up an E, as will be depicted in FIG. 2 and described later.

The drawing component 114 may also utilize a color component 116 to identify a color to assign to each character. The color component 116 may maintain a list of color codes. As mentioned earlier, in an example embodiment, each character in a language may be assigned its own color code, and the noise may also be assigned its own color code. Thus, in an example embodiment, the drawing has the corresponding vectors colored using the assigned color codes, rather than all the vectors sharing the same color.

At this point, a drawing containing rotated and essentially "smushed together" characters has been created in a way that would be visually difficult to discern individual characters from, and may represent a single picture of vector art rather than a stream of characters. Nevertheless, to further decrease the possibility of hacking or otherwise decrypting the data without authorization, additional vectors are added to the drawing, with the additional vectors representing noise that will confuse any attempts at unauthorized decryption. These noise vectors may be added by a machine learning model 117 that has been trained to add noise vectors in a manner that is more likely to make the resulting drawing difficult to perform unauthorized decryption on. In an example embodiment, the machine learning model 117 connects additional potential intersection points in the drawing, as well as adding some potential intersection points into that analysis. Thus, for example, the machine learning model 117 may add an intersection point in one or more corners of the drawing as a whole, if one does not exist in the drawing already, and also connect those added intersection points and/or other intersection points in the drawing that are not already connected. In an example embodiment, these added connections may be straight lines between connection points, but embodiments are possible where more complex lines, such as curved lines, between the connection points are also added.

Since one of the goals of the adding of these noise vectors to the drawing is to "confuse" anyone or anything that views the drawing so that they do not recognize the drawing as a combination of characters in a language, the machine learning model 117 will wind up learning how to add vectors to drawings in a manner that makes the pattern of characters in the original data less recognizable as characters.

The machine learning model 117 may create the noise vectors based on a series of parameters that are learned during training of the machine learning model 116.

Training of the machine learning model 117 may be accomplished in a number of different ways. In one example embodiment, drawings output by the machine learning model 117 (which include noise vectors added) will be presented to a user in a graphical user interface prior to being used in a communication. For example, a user wishing to encrypt a piece of data will be shown the drawing representing that piece of data prior to it being sent in a communication, allowing the user to approve or reject the drawing. If the user, for example, is able to discern a pattern of characters within the drawing, he or she may reject the drawing, and that rejection will act as a negative label for the parameters that the machine learning model 117 used to create the noise vectors. Likewise, if the user accepts the drawing, that acceptance will act as a positive label for the parameters. Indeed, the user's opinion of the encrypted data is perhaps more relevant than anyone else's opinion, because the user is familiar with what the original data reads like, and thus if anyone is able to spot the original data in the encrypted drawing (or at least deduce the original data from the encrypted drawing), it will most likely be the user.

Thus, the user's acceptance or rejection of a drawing is fed as feedback to a machine learning algorithm 118 that is used to train (or retrain) the machine learning model 117.

In another example embodiment, a dedicated training phase may be performed where sample drawings are labeled (with either positive or negative labels, or in some example embodiments with more complex labels like scores), and fed to the machine learning algorithm 118 to train (or retrain) the machine learning model 117. In some example embodiments both a dedicated training phase and user feedback are used to train or retrain the machine learning model 117.

In an example embodiment, the machine learning algorithm 118 may iterate among various weights (which are the parameters) that will be multiplied by various input variables and evaluate a loss function at each iteration, until the loss function is minimized, at which stage the weights/parameters for that stage are learned. The past training data may include manually labeled data. Specifically, the weights are multiplied by the input variables as part of a weighted sum operation, and the weighted sum operation is used by the loss function.

The machine learning algorithm 118 may also be selected from among many other different potential supervised or unsupervised machine learning algorithms. Examples of supervised learning algorithms include artificial neural networks, Bayesian networks, instance-based learning, support vector machines, linear classifiers, quadratic classifiers, k-nearest neighbor, decision trees, and hidden Markov models.

In a further example embodiment, the encryption engine 102 may further include a graph engine 120. The graph engine 120 can further add complexity to the drawing, such as by adding additional noise and/or converting a two-dimensional drawing to three dimensions.

For decryption of encrypted data (which will take the form of a vector drawing), a decryption engine 122 is utilized. The decryption engine 122 may contain all of the same parts as the encryption engine 102, but it uses them in reversed order. Here the parts are depicted as being duplicates (one set in the encryption engine 102 and one set in the decryption engine 122), but in example embodiments both the encryption engine 102 and the decryption engine 122 share the exact same parts.

Thus, first the decryption engine 122 uses the machine learning model 123 and possibly graph engine 124 and color component 126 to remove the noise vectors from the encryption engine 102. This may include recognizing the color code of the vectors in the drawing that correspond to the color code assigned to noise, and removing any vectors having that color code. Then the intersection points in the noise-less drawing are identified by drawing component 128 and those intersection points representing the borders of characters which were previously "smushed" together are spaced apart again. Rotation component 130 then rotates the characters opposite from how they were rotated in the encryption process (e.g., if they were rotated 90 degrees counterclockwise during encryption, they are rotated 90 degrees clockwise during decryption). The remaining vector drawings of each character can then be converted back to actual characters in the language using linguistic agent 132 and language database 134. At this point, the original data is back and completely decrypted.

Since ordinarily the device performing the encryption will be different than the device performing the decryption, then it will be the encryption engine 102 on one device performing the encryption and the decryption engine 122 on the other device performing the decryption. In order to ensure that the addition of noise and the removal of the noise operate properly, in an example embodiment, parameters of the machine learning model 116 are shared among the two devices.

Figure 2:
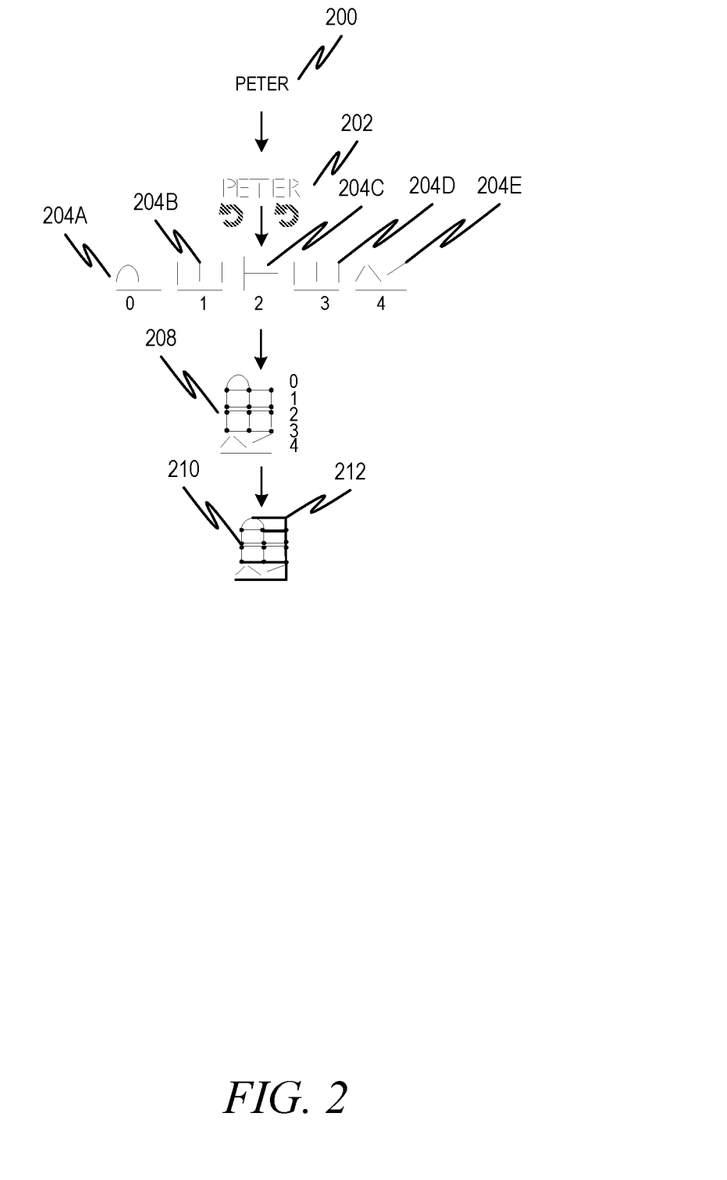
FIG. 2 is a diagram illustrating an example of encryption, in accordance with an example embodiment.

FIG. 2 is a diagram illustrating an example of encryption, in accordance with an example embodiment. Here, data 200 is the word "PETER". A linguistic agent in an encryption engine will recognize these characters as part of an English language character set, and may retrieve corresponding vector-based representations 202 of each of the characters, which may include multiple vectors/sub characters for each of the characters. A rotation component then rotates the vector-based representation, here depicted as being rotated 90 degrees counterclockwise, producing rotated vector-based representations 204A-204E. An indexing component then assigns indexes to each of the rotated vector-based representation, based on the ordering of the original data (e.g., since "P" was the first character of the data, it is assigned index 0). A drawing engine then orders each of the rotated vector-based representations 204A-204E vertically in order based on their assigned indexes (here depicted as being ordered forward from 0 to 4 starting from the top, but alternatively could be ordered reverse from 4 to 0 starting from the top). The drawing engine also removes the space between the rotated vector-based representations 204A-204E so that they are each touching each other at their respective borders, such as by connecting adjacent intersection points. This results in drawing 208, with the combined intersection points. The machine learning model then adds noise to the drawing 208 by identifying other potential intersection points, and connecting them to add noise and produce encrypted drawing 212.0 Here, the added potential intersection point 212 is also displayed, and the newly added noise vectors are depicted in bold to make this figure easier to read. In reality, however, the noise vectors will not be bolded but will be the same thickness as the other vectors. In some example embodiments, the noise vectors will be colored based on a color code assigned to noise vectors, while the other vectors will be assigned color codes based on their respective characters, but this colorization aspect is not depicted in FIG. 2.

Figure 3:
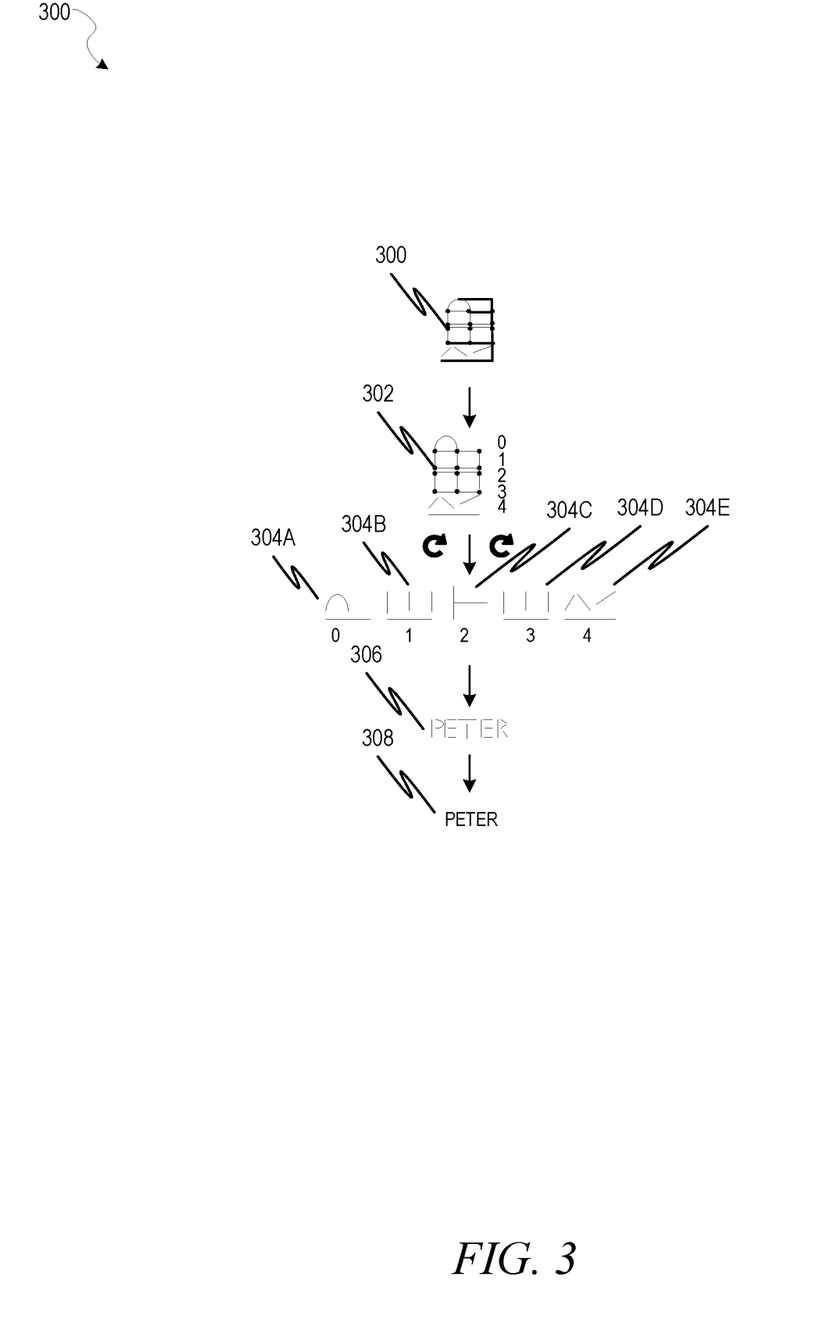
FIG. 3 is a diagram illustrating an example of decryption, in accordance with an example embodiment.

FIG. 3 is a diagram illustrating an example of decryption, in accordance with an example embodiment. The encrypted drawing 300 is received by a decryption engine. The machine learned model is used to remove the noise vectors, producing drawing 302. A drawing engine then adds back in the spaces between individual characters' vector representations, producing vector-based representations 304A-304E. A rotation engine reverses the rotation (e.g., rotates vector-based representations 304A-304E clockwise 90 degrees), producing vector-based representation 306. Then a linguistic agent recognizes these vector-based representations 304A-304E as the language characters and produces the unencrypted original data 308.

It should be noted that the above describes the processes of example embodiments based on the assumption that the data is written in a language that is read horizontally (either left-to-right or right-to-left), and the choice to combine the rotated vector-based representation vertically is based on that assumption. If, on the other hand, the data is written in a language that is read vertically, such as Chinese, Japanese, Vietnamese, or Korean, then in an example embodiment the rotated vector-based representations may be combined horizontally rather than vertically.

Figure 4:
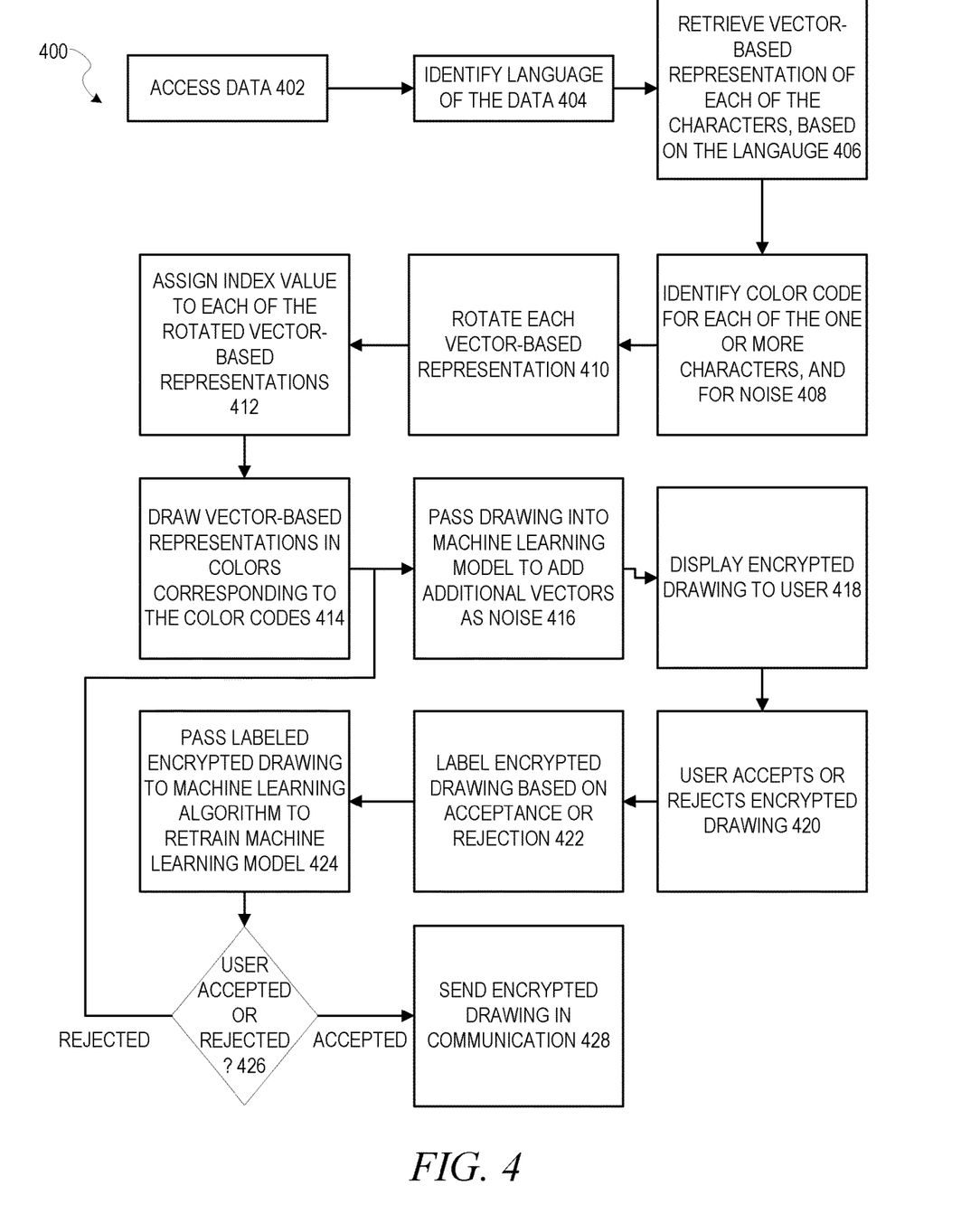
FIG. 4 is a flow diagram illustrating a method of encrypting data, in accordance with an example embodiment.

FIG. 4 is a flow diagram illustrating a method 400 of encrypting data, in accordance with an example embodiment. At operation 402, the data is accessed. The data contains one or more characters. At operation 404, a language of the data is identified. The language is one that is read in a first direction (e.g., left-to-right, right-to-left, top-to-bottom, etc.). At operation 406, based on the language, a vector-based representation is retrieved for each of the one or more characters. At operation 408, a color code is identified for each of the one or more characters, and for noise. At operation 410, each vector-based representation is rotated to produce a set of rotated vector-based representations. In an example embodiment, the direction of the rotation is based on the first direction. For example, if the first direction is left-to-right, then the direction of the rotation may be set at counterclockwise.

At operation 412, an index value is assigned to each of the rotated vector-based representations, the index value based on a relative ordering of the one or more characters in the data for corresponding rotated vector-based representations. At operation 414, the rotated vector-based representations are drawn in a single drawing so that borders of successive rotated vector-based representations in the relative ordering overlap each other, and such that the rotated vector-based representations are drawn in the relative ordering in a second direction perpendicular to the first direction. The vector-based representations may be drawn in colors corresponding to the color codes of their corresponding characters. At operation 416, the drawing is passed into a machine learning model, the machine learning model adding additional vectors to the drawing as noise, producing an encrypted drawing. These additional vectors may be in a color corresponding to the color code assigned to noise. At operation 418, the encrypted drawing is displayed to a user in a graphical user interface. At operation 420, the user accepts or rejects the encrypted drawing. At operation 422, the acceptance or rejection is added as a label to the encrypted drawing. At operation 424, the labeled encrypted drawing is passed to a machine learning algorithm to retrain the machine learning model. At operation 426, it is determined whether the encrypted drawing was accepted or rejection. If accepted, then at operation 428, the encrypted drawing is sent in a communication (where it can be received by another device and decrypted). If rejected, then the method repeats to operation 416. Since the machine learning model has now been retrained with a negative label, the encrypted drawing output at the repeated operation 416 is different than it was in the earlier execution of operation 416.

Figure 5:
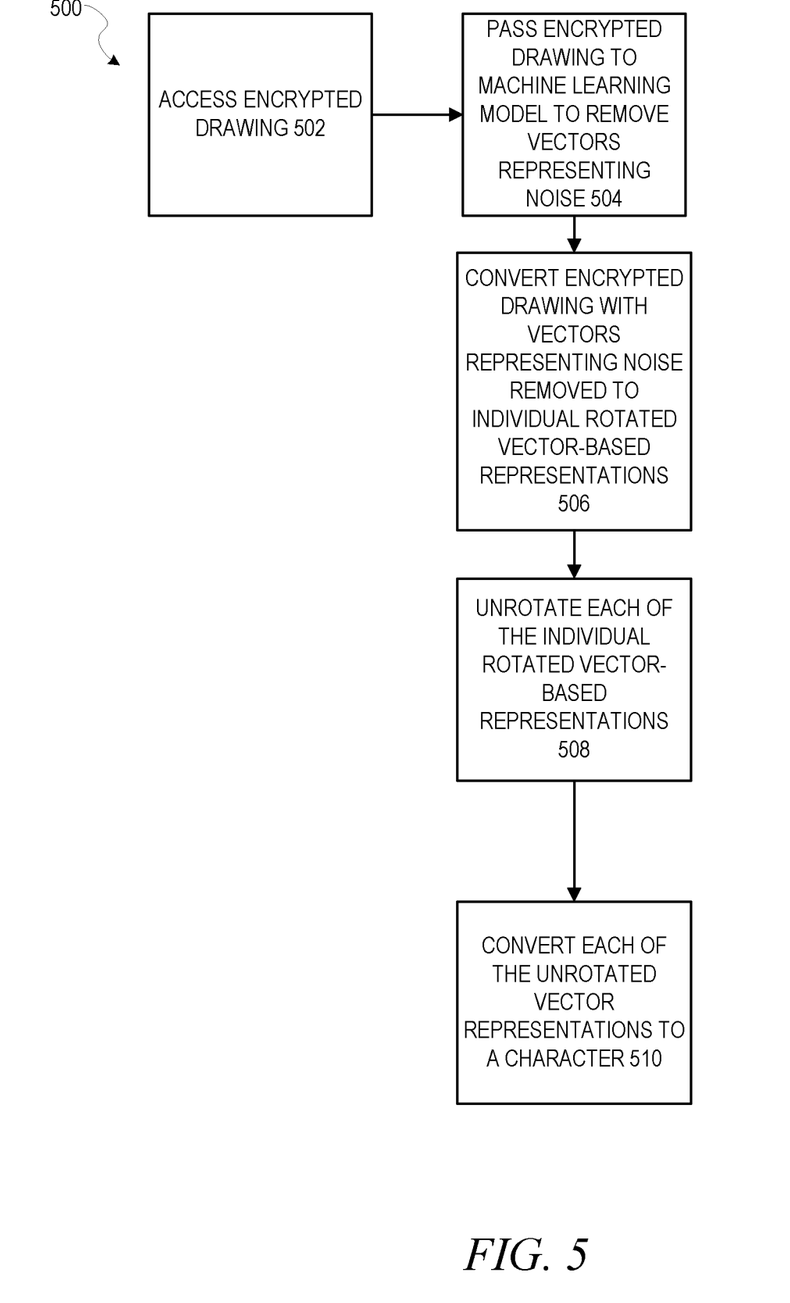
FIG. 5 is a flow diagram illustrating a method of decrypting data, in accordance with an example embodiment.

FIG. 5 is a flow diagram illustrating a method 500 of decrypting data, in accordance with an example embodiment. At operation 502, an encrypted drawing is accessed. At operation 504, the encrypted drawing is passed to a machine learning model to remove vectors representing noise in the encrypted drawing. In an example embodiment, the machine learned model may be the same as the machine learned model used in operation 416 of FIG. 4. The resulting encrypted drawing with the vectors removed are rotated vector-based representations that have been aligned in the second direction and whose borders of successive rotated vector-based representations in the relative ordering overlap each other.

At operation 506, the encrypted drawing with the vectors representing noise removed is converted to individual rotated vector-based representations corresponding to characters of a language, and aligned in the first direction. At operation 508, each of the individual rotated vector-based representations is unrotated. In this context, unrotated means performing a rotation operation in an opposite direction and in the same degree as the rotation operation that was performed in operation 410 of FIG. 4.

At operation 510, the unrotated vector-based representations are each converted to a character in the first language, producing the data (which has now been decrypted).

In view of the above-described implementations of subject matter, this application discloses the following list of examples, wherein one feature of an example in isolation or more than one feature of said example taken in combination and, optionally, in combination with one or more features of one or more further examples are further examples also falling within the disclosure of this application:

Example 1. A system comprising:
at least one hardware processor; and
a computer-readable medium storing instructions that, when executed by the at least one hardware processor, cause the at least one hardware processor to perform operations comprising:
accessing data, the data comprising one or more characters;
identifying a language of the data, the language being read in a first direction;
based on the language, retrieving a vector-based representation for each of the one or more characters;
rotating each vector-based representation to produce a set of rotated vector-based representations;
assigning an index value to each of the rotated vector-based representations, the index value based on a relative ordering of the one or more characters in the data for corresponding rotated vector-based representations;
drawing the rotated vector-based representations in a single drawing so that borders of successive rotated vector-based representations in the relative ordering overlap each other, and such that the rotated vector-based representations are drawn in the relative ordering in a second direction perpendicular to the first direction; and passing the drawing into a machine learning model, the machine learning model adding additional vectors to the drawing as noise, producing an encrypted drawing.

Example 2. The system of Example 1, further comprising assigning a color code to each of the rotated vector-based representations and to the noise, wherein the drawing the rotated vector-based representations including drawing each rotated vector-based representation in a color corresponding to its assigned color code, wherein the drawing the machine learning model further adds the additional vectors in a color corresponding to the color code assigned to the noise.

Example 3. The system of Example 1 or 2, further comprising training the machine learning model by passing a labeled drawing having additional vectors added as noise to a machine learning algorithm, wherein the label is indicative of how difficult it is to determine the data from the labeled drawing.

Example 4. The system of Example 3, wherein the labeled drawing is the encrypted drawing labeled by a user subsequent to the user being presented with the encrypted drawing in a graphical user interface.

Example 5. The system of Example 3, wherein the labeled drawing is part of a set of labeled drawing passed to the machine learning algorithm during a dedicated training phase.

Example 6. The system of Example 4, wherein the machine learning model is retrained by the machine learning algorithm using the labeled drawing.

Example 7. The system of any of Examples 1-6, wherein the direction of the rotating is dependent on the first direction.

Example 8. A method comprising:
accessing data, the data comprising one or more characters;
identifying a language of the data, the language being read in a first direction;
based on the language, retrieving a vector-based representation for each of the one or more characters;

rotating each vector-based representation to produce a set of rotated vector-based representations;

assigning an index value to each of the rotated vector-based representations, the index value based on a relative ordering of the one or more characters in the data for corresponding rotated vector-based representations;

drawing the rotated vector-based representations in a single drawing so that borders of successive rotated vector-based representations in the relative ordering overlap each other, and such that the rotated vector-based representations are drawn in the relative ordering in a second direction perpendicular to the first direction; and passing the drawing into a machine learning model, the machine learning model adding additional vectors to the drawing as noise, producing an encrypted drawing.

Example 9. The method of Example 8, further comprising assigning a color code to each of the rotated vector-based representations and to the noise, wherein the drawing the rotated vector-based representations including drawing each rotated vector-based representation in a color corresponding to its assigned color code, wherein the drawing the machine learning model further adds the additional vectors in a color corresponding to the color code assigned to the noise.

Example 10. The method of Examples 8 or 9, further comprising training the machine learning model by passing a labeled drawing having additional vectors added as noise to a machine learning algorithm, wherein the label is indicative of how difficult it is to determine the data from the labeled drawing.

Example 11. The method of Example 10, wherein the labeled drawing is the encrypted drawing labeled by a user subsequent to the user being presented with the encrypted drawing in a graphical user interface.

Example 12. The method of Example 10, wherein the labeled drawing is part of a set of labeled drawing passed to the machine learning algorithm during a dedicated training phase.

Example 13. The method of Example 11, wherein the machine learning model is retrained by the machine learning algorithm using the labeled drawing.

Example 14. The method of any of Examples 8-14, wherein the direction of the rotating is dependent on the first direction.

Example 15. A non-transitory machine-readable medium storing instructions which, when executed by one or more processors, cause the one or more processors to perform operations comprising:

accessing data, the data comprising one or more characters;

identifying a language of the data, the language being read in a first direction;

based on the language, retrieving a vector-based representation for each of the one or more characters;

rotating each vector-based representation to produce a set of rotated vector-based representations;

assigning an index value to each of the rotated vector-based representations, the index value based on a relative ordering of the one or more characters in the data for corresponding rotated vector-based representations;

drawing the rotated vector-based representations in a single drawing so that borders of successive rotated vector-based representations in the relative ordering overlap each other, and such that the rotated vector-based representations are drawn in the relative ordering in a second direction perpendicular to the first direction; and passing the drawing into a machine learning model, the machine learning model adding additional vectors to the drawing as noise, producing an encrypted drawing.

Example 16. The non-transitory machine-readable medium of Example 15, further comprising assigning a color code to each of the rotated vector-based representations and to the noise, wherein the drawing the rotated vector-based representations including drawing each rotated vector-based representation in a color corresponding to its assigned color code, wherein the drawing the machine learning model further adds the additional vectors in a color corresponding to the color code assigned to the noise.

Example 17. The non-transitory machine-readable medium of Examples 15 or 16, further comprising training the machine learning model by passing a labeled drawing having additional vectors added as noise to a machine learning algorithm, wherein the label is indicative of how difficult it is to determine the data from the labeled drawing.

Example 18. The non-transitory machine-readable medium of Example 17, wherein the labeled drawing is the encrypted drawing labeled by a user subsequent to the user being presented with the encrypted drawing in a graphical user interface.

Example 19. The non-transitory machine-readable medium of Example 17, wherein the labeled drawing is part of a set of labeled drawing passed to the machine learning algorithm during a dedicated training phase.

Example 20. The non-transitory machine-readable medium of Example 18, wherein the machine learning model is retrained by the machine learning algorithm using the labeled drawing.

Figure 6:
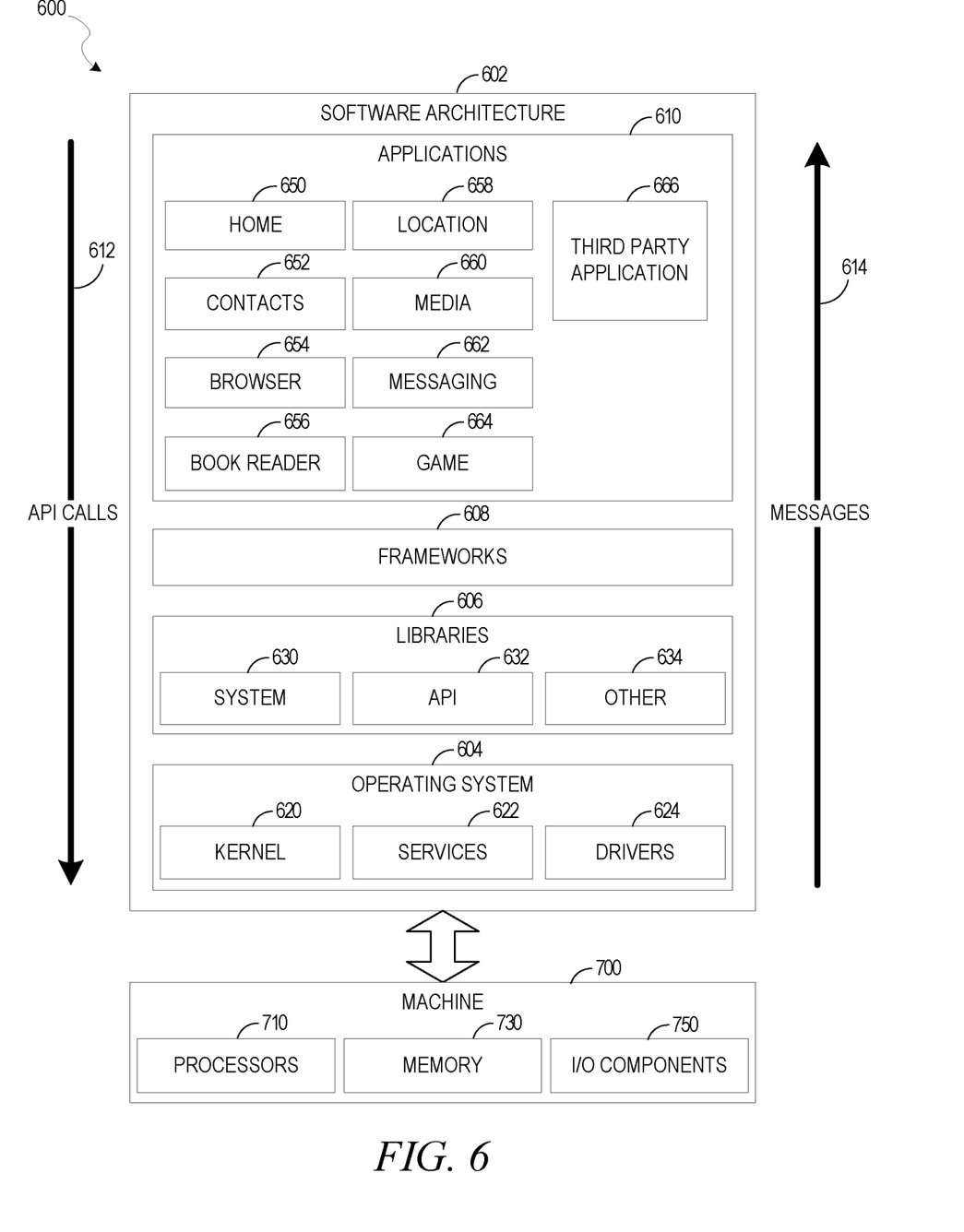
FIG. 6 is a block diagram illustrating a software architecture, which can be installed on any one or more of the devices described above.

FIG. 6 is a block diagram 600 illustrating a software architecture 602, which can be installed on any one or more of the devices described above. FIG. 6 is merely a non-limiting example of a software architecture, and it will be appreciated that many other architectures can be implemented to facilitate the functionality described herein. In various embodiments, the software architecture 602 is implemented by hardware such as a machine 700 of FIG. 7 that includes processors 710, memory 730, and input/output (I/O) components 750. In this example architecture, the software architecture 602 can be conceptualized as a stack of layers where each layer may provide a particular functionality. For example, the software architecture 602 includes layers such as an operating system 604, libraries 606, frameworks 608, and applications 610. Operationally, the applications 610 invoke Application Program Interface (API) calls 612 through the software stack and receive messages 614 in response to the API calls 612, consistent with some embodiments.

In various implementations, the operating system 604 manages hardware resources and provides common services. The operating system 604 includes, for example, a kernel 620, services 622, and drivers 624. The kernel 620 acts as an abstraction layer between the hardware and the other software layers, consistent with some embodiments. For example, the kernel 620 provides memory management, processor management (e.g., scheduling), component management, networking, and security settings, among other functionality. The services 622 can provide other common services for the other software layers. The drivers 624 are responsible for controlling or interfacing with the underlying hardware. For instance, the drivers 624 can include display drivers, camera drivers, BLUETOOTH® or BLUETOOTH® Low-Energy drivers, flash memory drivers, serial communication drivers (e.g., Universal Serial Bus (USB) drivers), Wi-Fi® drivers, audio drivers, power management drivers, and so forth.

In some embodiments, the libraries 606 provide a low-level common infrastructure utilized by the applications 610. The libraries 606 can include system libraries 630 (e.g., C standard library) that can provide functions such as memory allocation functions, string manipulation functions, mathematic functions, and the like. In addition, the libraries 606 can include API libraries 632 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two-dimensional (2D) and three-dimensional (3D) in a graphic context on a display), database libraries (e.g., SQLite to provide various relational database functions), web libraries (e.g., WebKit to provide web browsing functionality), and the like. The libraries 606 can also include a wide variety of other libraries 634 to provide many other APIs to the applications 610.

The frameworks 608 provide a high-level common infrastructure that can be utilized by the applications 610. For example, the frameworks 608 provide various graphical user interface (GUI) functions, high-level resource management, high-level location services, and so forth. The frameworks 608 can provide a broad spectrum of other APIs that can be utilized by the applications 610, some of which may be specific to a particular operating system 604 or platform.

In an example embodiment, the applications 610 include a home application 650, a contacts application 652, a browser application 654, a book reader application 656, a location application 658, a media application 660, a messaging application 662, a game application 664, and a broad assortment of other applications, such as a third-party application 666. The applications 610 are programs that execute functions defined in the programs. Various programming languages can be employed to create one or more of the applications 610, structured in a variety of manners, such as object-oriented programming languages (e.g., Objective-C, Java, or C++) or procedural programming languages (e.g., C or assembly language). In a specific example, the third-party application 666 (e.g., an application developed using the ANDROID™ or IOS™ software development kit (SDK) by an entity other than the vendor of the particular platform) may be mobile software running on a mobile operating system such as IOS™, ANDROID™ WINDOWS® Phone, or another mobile operating system. In this example, the third-party application 666 can invoke the API calls 612 provided by the operating system 604 to facilitate functionality described herein.

Figure 7:
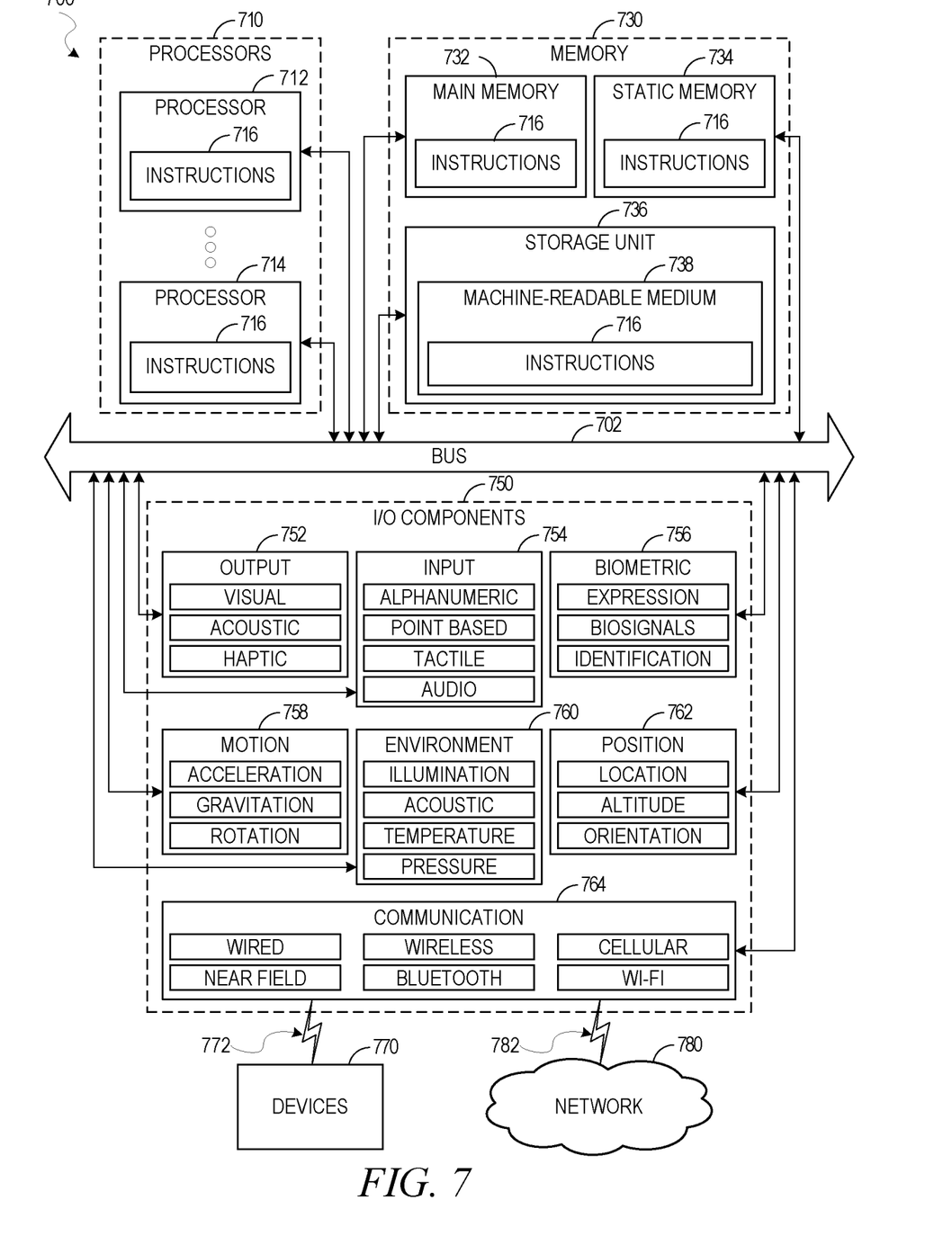
FIG. 7 illustrates a diagrammatic representation of a machine in the form of a computer system within which a set of instructions may be executed for causing the machine to perform any one or more of the methodologies discussed herein.

FIG. 7 illustrates a diagrammatic representation of a machine 700 in the form of a computer system within which a set of instructions may be executed for causing the machine 700 to perform any one or more of the methodologies discussed herein. Specifically, FIG. 7 shows a diagrammatic representation of the machine 700 in the example form of a computer system, within which instructions 716 (e.g., software, a program, an application, an applet, an app, or other executable code) for causing the machine 700 to perform any one or more of the methodologies discussed herein may be executed. For example, the instructions 716 may cause the machine 700 to execute the method of FIGS. 4 and 6. Additionally, or alternatively, the instructions 716 may implement FIGS. 1-5 and so forth. The instructions 716 transform the general, non-programmed machine 700 into a particular machine 700 programmed to carry out the described and illustrated functions in the manner described. In alternative embodiments, the machine 700 operates as a standalone device or may be coupled (e.g., networked) to other machines. In a networked deployment, the machine 700 may operate in the capacity of a server machine or a client machine in a server-client network environment, or as a peer machine in a peer-to-peer (or distributed) network environment. The machine 700 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 716, sequentially or otherwise, that specify actions to be taken by the machine 700. Further, while only a single machine 700 is illustrated, the term "machine" shall also be taken to include a collection of machines 700 that individually or jointly execute the instructions 716 to perform any one or more of the methodologies discussed herein.

The machine 700 may include processors 710, memory 730, and I/O components 750, which may be configured to communicate with each other such as via a bus 702. In an example embodiment, the processors 710 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 712 and a processor 714 that may execute the instructions 716. The term "processor" is intended to include multi-core processors that may comprise two or more independent processors (sometimes referred to as "cores") that may execute instructions 716 contemporaneously. Although FIG. 7 shows multiple processors 710, the machine 700 may include a single processor 712 with a single core, a single processor 712 with multiple cores (e.g., a multi-core processor 712), multiple processors 712, 714 with a single core, multiple processors 712, 714 with multiple cores, or any combination thereof.

The memory 730 may include a main memory 732, a static memory 734, and a storage unit 736, each accessible to the processors 710 such as via the bus 702. The main memory 732, the static memory 734, and the storage unit 736 store the instructions 716 embodying any one or more of the methodologies or functions described herein. The instructions 716 may also reside, completely or partially, within the main memory 732, within the static memory 734, within the storage unit 736, within at least one of the processors 710 (e.g., within the processor's cache memory), or any suitable combination thereof, during execution thereof by the machine 700.

The I/O components 750 may include a wide variety of components to receive input, provide output, produce output, transmit information, exchange information, capture measurements, and so on. The specific I/O components 750 that are included in a particular machine will depend on the type of machine. For example, portable machines such as mobile phones will likely include a touch input device or other such input mechanisms, while a headless server machine will likely not include such a touch input device. It will be appreciated that the I/O components 750 may include many other components that are not shown in FIG. 7. The I/O components 750 are grouped according to functionality merely for simplifying the following discussion, and the grouping is in no way limiting. In various example embodiments, the I/O components 750 may include output components 752 and input components 754. The output components 752 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 754 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 750 may include biometric components 756, motion components 758, environmental components 760, or position components 762, among a wide array of other components. For example, the biometric components 756 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 758 may include acceleration sensor components (e.g., accelerometer), gravitation sensor components, rotation sensor components (e.g., gyroscope), and so forth. The environmental components 760 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 762 may include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 750 may include communication components 764 operable to couple the machine 700 to a network 780 or devices 770 via a coupling 782 and a coupling 772, respectively. For example, the communication components 764 may include a network interface component or another suitable device to interface with the network 780. In further examples, the communication components 764 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 770 may be another machine or any of a wide variety of peripheral devices (e.g., coupled via a USB).

Moreover, the communication components 764 may detect identifiers or include components operable to detect identifiers. For example, the communication components 764 may include radio-frequency identification (RFID) tag reader components, NFC smart tag detection components, optical reader components (e.g., an optical sensor to detect one-dimensional bar codes such as Universal Product Code (UPC) bar code, multi-dimensional bar codes such as QR code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 764, such as location via Internet Protocol (IP) geolocation, location via Wi-Fi® signal triangulation, location via detecting an NFC beacon signal that may indicate a particular location, and so forth.

The various memories (i.e., 730, 732, 734, and/or memory of the processor(s) 710) and/or the storage unit 736 may store one or more sets of instructions 716 and data structures (e.g., software) embodying or utilized by any one or more of the methodologies or functions described herein. These instructions (e.g., the instructions 716), when executed by the processor(s) 710, cause various operations to implement the disclosed embodiments.

As used herein, the terms "machine-storage medium," "device-storage medium," and "computer-storage medium" mean the same thing and may be used interchangeably. The terms refer to single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate array (FPGA), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In various example embodiments, one or more portions of the network 780 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 780 or a portion of the network 780 may include a wireless or cellular network, and the coupling 782 may be a Code Division Multiple Access (CDMA) connection, a Global System for Mobile communications (GSM) connection, or another type of cellular or wireless coupling. In this example, the coupling 782 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data transfer technology.

The instructions 716 may be transmitted or received over the network 780 using a transmission medium via a network interface device (e.g., a network interface component included in the communication components 764) and utilizing any one of a number of well-known transfer protocols (e.g., Hypertext Transfer Protocol (HTTP)). Similarly, the instructions 716 may be transmitted or received using a transmission medium via the coupling 772 (e.g., a peer-to-peer coupling) to the devices 770. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 716 for execution by the machine 700, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

What is claimed is:

1. A system comprising:
   at least one hardware processor; and
   a computer-readable medium storing instructions that, when executed by the at least one hardware processor, cause the at least one hardware processor to perform operations comprising:
      accessing data, the data comprising one or more characters;
      identifying a language of the data, the language being read in a first direction;
      based on the language, retrieving a vector-based representation for each of the one or more characters;
      rotating each vector-based representation to produce a set of rotated vector-based representations;
      assigning an index value to each of the rotated vector-based representations, the index value based on a relative ordering of the one or more characters in the data for corresponding rotated vector-based representations;
      drawing the rotated vector-based representations in a single drawing so that borders of successive rotated vector-based representations in the relative ordering overlap each other, and such that the rotated vector-based representations are drawn in the relative ordering in a second direction perpendicular to the first direction; and
      passing the drawing into a machine learning model, the machine learning model adding additional vectors to the drawing as noise, producing an encrypted drawing.

2. The system of claim 1, further comprising assigning a color code to each of the rotated vector-based representations and to the noise, wherein the drawing the rotated vector-based representations includes drawing each rotated vector-based representation in a color corresponding to its assigned color code, wherein the machine learning model further adds the additional vectors to the drawing in a color corresponding to the color code assigned to the noise.

3. The system of claim 1, further comprising training the machine learning model by passing a labeled drawing having additional vectors added as noise to a machine learning algorithm, wherein a label in the labeled drawing is indicative of how difficult it is to determine the data from the labeled drawing.

4. The system of claim 3, wherein the labeled drawing is the encrypted drawing labeled by a user subsequent to the user being presented with the encrypted drawing in a graphical user interface.

5. The system of claim 3, wherein the labeled drawing is part of a set of labeled drawings passed to the machine learning algorithm during a dedicated training phase.

6. The system of claim 4, wherein the machine learning model is retrained by the machine learning algorithm using the labeled drawing.

7. The system of claim 1, wherein the direction of the rotating is dependent on the first direction.

8. A method comprising:
   accessing data, the data comprising one or more characters;
   identifying a language of the data, the language being read in a first direction;
   based on the language, retrieving a vector-based representation for each of the one or more characters;
   rotating each vector-based representation to produce a set of rotated vector-based representations;
   assigning an index value to each of the rotated vector-based representations, the index value based on a relative ordering of the one or more characters in the data for corresponding rotated vector-based representations;
   drawing the rotated vector-based representations in a single drawing so that borders of successive rotated vector-based representations in the relative ordering overlap each other, and such that the rotated vector-based representations are drawn in the relative ordering in a second direction perpendicular to the first direction; and
   passing the drawing into a machine learning model, the machine learning model adding additional vectors to the drawing as noise, producing an encrypted drawing.

9. The method of claim 8, further comprising assigning a color code to each of the rotated vector-based representations and to the noise, wherein the drawing the rotated vector-based representations includes drawing each rotated vector-based representation in a color corresponding to its assigned color code, wherein the machine learning model further adds the additional vectors to the drawing in a color corresponding to the color code assigned to the noise.

10. The method of claim 8, further comprising training the machine learning model by passing a labeled drawing having additional vectors added as noise to a machine learning algorithm, wherein a label in the labeled drawing is indicative of how difficult it is to determine the data from the labeled drawing.

11. The method of claim 10, wherein the labeled drawing is the encrypted drawing labeled by a user subsequent to the user being presented with the encrypted drawing in a graphical user interface.

12. The method of claim 10, wherein the labeled drawing is part of a set of labeled drawings passed to the machine learning algorithm during a dedicated training phase.

13. The method of claim 11, wherein the machine learning model is retrained by the machine learning algorithm using the labeled drawing.

14. The method of claim 8, wherein the direction of the rotating is dependent on the first direction.

15. A non-transitory machine-readable medium storing instructions which, when executed by one or more processors, cause the one or more processors to perform operations comprising:
   accessing data, the data comprising one or more characters;
   identifying a language of the data, the language being read in a first direction;
   based on the language, retrieving a vector-based representation for each of the one or more characters;
   rotating each vector-based representation to produce a set of rotated vector-based representations;
   assigning an index value to each of the rotated vector-based representations, the index value based on a relative ordering of the one or more characters in the data for corresponding rotated vector-based representations;
   drawing the rotated vector-based representations in a single drawing so that borders of successive rotated vector-based representations in the relative ordering overlap each other, and such that the rotated vector-based representations are drawn in the relative ordering in a second direction perpendicular to the first direction; and
   passing the drawing into a machine learning model, the machine learning model adding additional vectors to the drawing as noise, producing an encrypted drawing.

16. The non-transitory machine-readable medium of claim 15, further comprising assigning a color code to each of the rotated vector-based representations and to the noise, wherein the drawing the rotated vector-based representations includes drawing each rotated vector-based representation in a color corresponding to its assigned color code, wherein the machine learning model further adds the additional vectors to the drawing in a color corresponding to the color code assigned to the noise.

17. The non-transitory machine-readable medium of claim 15, further comprising training the machine learning model by passing a labeled drawing having additional vectors added as noise to a machine learning algorithm, wherein a label in the labeled drawing is indicative of how difficult it is to determine the data from the labeled drawing.

18. The non-transitory machine-readable medium of claim 17, wherein the labeled drawing is the encrypted drawing labeled by a user subsequent to the user being presented with the encrypted drawing in a graphical user interface.

19. The non-transitory machine-readable medium of claim 17, wherein the labeled drawing is part of a set of labeled drawings passed to the machine learning algorithm during a dedicated training phase.

20. The non-transitory machine-readable medium of claim 18, wherein the machine learning model is retrained by the machine learning algorithm using the labeled drawing.

\* \* \* \* \*